United States Patent
Irie et al.

(10) Patent No.: US 11,884,180 B2
(45) Date of Patent: Jan. 30, 2024

(54) BATTERY SYSTEM AND METHOD OF CONTROLLING BATTERY SYSTEM

(71) Applicants: TOYOTA JIDOSHA KABUSHIKI KAISHA, Toyota (JP); PRIMEARTH EV ENERGY CO., LTD., Kosai (JP)

(72) Inventors: Takayuki Irie, Nisshin (JP); Jun Satoh, Toyota (JP); Junichi Matsumoto, Toyota (JP); Daisuke Koba, Toyohashi (JP); Yosuke Murota, Toyohashi (JP); Kazuki Nakano, Toyohashi (JP); Suguru Muraki, Toyohashi (JP)

(73) Assignees: TOYOTA JIDOSHA KABUSHIKI KAISHA, Toyota (JP); PRIMEARTH EV ENERGY CO., LTD., Kosai (JP)

( * ) Notice: Subject to any disclaimer, the term of this patent is extended or adjusted under 35 U.S.C. 154(b) by 241 days.

(21) Appl. No.: 17/183,558

(22) Filed: Feb. 24, 2021

(65) Prior Publication Data
US 2021/0276451 A1    Sep. 9, 2021

(30) Foreign Application Priority Data

Mar. 3, 2020 (JP) .................................. 2020-035593

(51) Int. Cl.
*B60L 53/62* (2019.01)
*B60L 58/13* (2019.01)
*H01M 10/34* (2006.01)
*H01M 10/44* (2006.01)

(52) U.S. Cl.
CPC .............. *B60L 58/13* (2019.02); *B60L 53/62* (2019.02); *H01M 10/345* (2013.01); *H01M 10/443* (2013.01); *H01M 2220/20* (2013.01)

(58) Field of Classification Search
CPC ...... B60L 58/13; B60L 53/62; H01M 10/345; H01M 10/443; H01M 2220/20
See application file for complete search history.

(56) References Cited

U.S. PATENT DOCUMENTS

| | | | | |
|---|---|---|---|---|
| 2008/0299458 A1* | 12/2008 | Yoshida | ................ | H01M 4/242 429/218.2 |
| 2010/0201323 A1* | 8/2010 | Okamura | .............. | H02J 7/0031 320/134 |
| 2014/0285157 A1* | 9/2014 | Koba | .................... | H01M 10/44 320/137 |
| 2015/0207341 A1* | 7/2015 | Kagami | .................. | B60L 58/24 320/107 |
| 2019/0094305 A1* | 3/2019 | Takechi | ................. | G01R 31/36 |

FOREIGN PATENT DOCUMENTS

| | | |
|---|---|---|
| CN | 104488130 A | 4/2015 |
| JP | 2014-087218 A | 5/2014 |

* cited by examiner

*Primary Examiner* — Drew A Dunn
*Assistant Examiner* — Pamela J Jeppson
(74) *Attorney, Agent, or Firm* — Sughrue Mion, PLLC

(57) ABSTRACT

A battery system includes a nickel-metal hydride battery and an ECU that controls charging and discharging of the nickel-metal hydride battery. The ECU calculates a discharge electricity amount showing an integrated value of a current discharged from the nickel-metal hydride battery, and further calculates ΔSOC of the nickel-metal hydride battery in a prescribed time period. The ECU calculates a charge reserve capacity of the nickel-metal hydride battery based on a temperature of the nickel-metal hydride battery, the discharge electricity amount, and the ΔSOC.

6 Claims, 13 Drawing Sheets

FIG.6

CHARGE RESERVE CAPACITY

| BATTERY TEMPERATURE T1 | | DISCHARGE ELECTRICITY AMOUNT | | | | | | |
|---|---|---|---|---|---|---|---|---|
| | | E1 | E2 | E3 | E4 | E5 | E6 | E7 |
| ΔSOC | S1 | D11 | D12 | D13 | D14 | D15 | D16 | D17 |
| | S2 | D21 | D22 | D23 | D24 | D25 | D26 | D27 |
| | S3 | D31 | D32 | D33 | D34 | D35 | D36 | D37 |
| | S4 | D41 | D42 | D43 | D44 | D45 | D46 | D47 |
| | S5 | D51 | D52 | D53 | D54 | D55 | D56 | D57 |
| | S6 | D61 | D62 | D63 | D64 | D65 | D66 | D67 |
| | S7 | D71 | D72 | D73 | D74 | D75 | D76 | D77 |

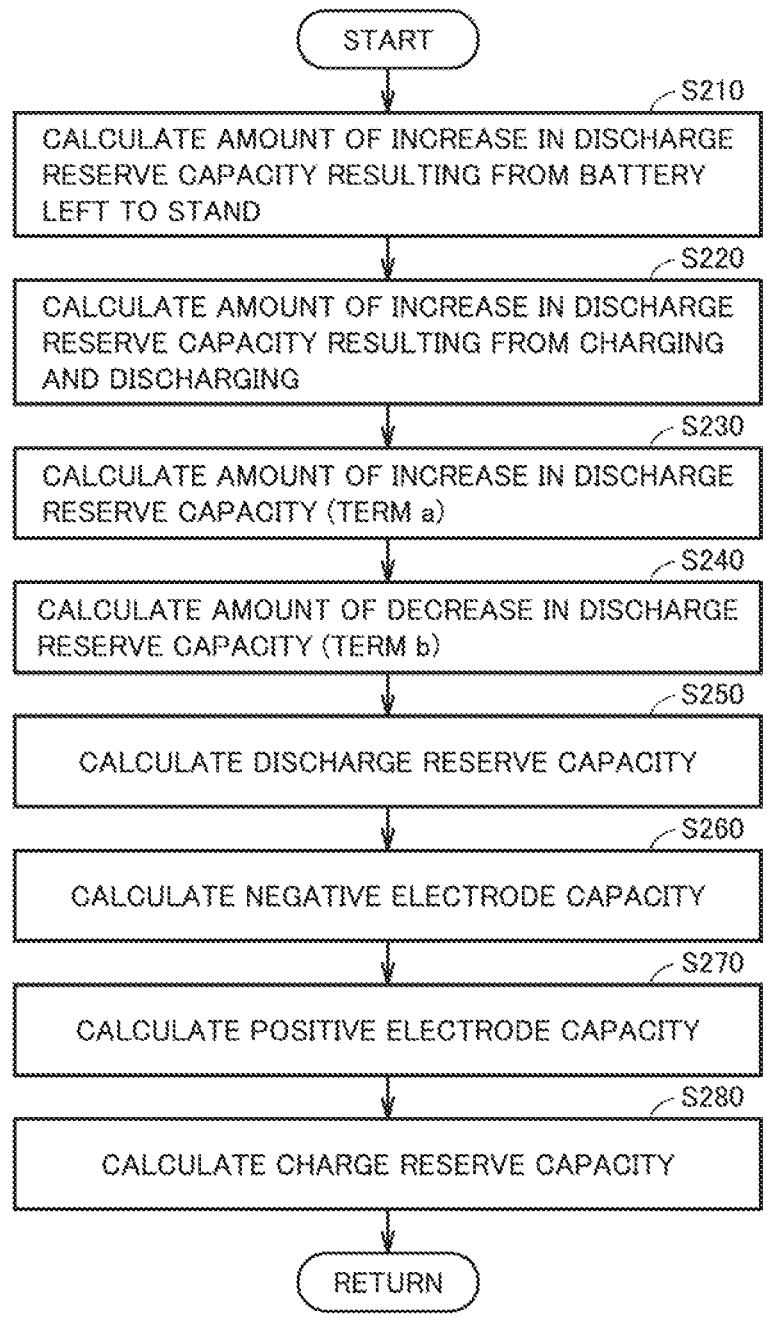

BATTERY SYSTEM AND METHOD OF CONTROLLING BATTERY SYSTEM

This nonprovisional application is based on Japanese Patent Application No. 2020-035593 filed on Mar. 3, 2020 with the Japan Patent Office, the entire contents of which are hereby incorporated by reference.

BACKGROUND

Field

The present disclosure relates to a battery system and a method of controlling the battery system, and particularly to a battery system including a nickel-metal hydride battery and a method of controlling the battery system.

Description of the Background Art

Japanese Patent Laying-Open No. 2014-87218 discloses a battery system capable of improving the accuracy of estimating the negative electrode reserve capacity in a nickel-metal hydride battery. This battery system applies the correlation between the temperature of the nickel-metal hydride battery and the negative electrode reserve capacity to calculate a negative electrode reserve capacity appropriate to the temperature acquired by a temperature sensor. When the negative electrode reserve capacity decreases, the charging and discharging power of the nickel-metal hydride battery is restricted. Thereby, progress of deterioration in the nickel-metal hydride battery can be suppressed.

In a nickel-metal hydride battery (which may be hereinafter simply referred to as a "battery"), when the negative electrode deteriorates (oxidizes) to thereby decrease the charge reserve capacity in the negative electrode, the negative electrode generates hydrogen gas, and the internal pressure in the battery rises. Such a nickel-metal hydride battery is generally provided with a safety valve that opens as the internal pressure rises, thereby preventing the internal pressure from abnormally rising. However, when the safety valve opens, the electrolytic solution is discharged to the outside together with gas. Thus, the electrolytic solution decreases, and the performance of the battery deteriorates. In other words, when the charge reserve capacity decreases, the performance of the battery deteriorates.

Thus, by accurately calculating the charge reserve capacity and executing appropriate control based on the calculation result, the performance deterioration in the battery can be appropriately suppressed. In the battery system disclosed in Japanese Patent Laying-Open No. 2014-87218, the negative electrode reserve capacity is calculated based on the temperature of the battery. In particular, the accuracy for calculating the charge reserve capacity needs to be improved.

SUMMARY

The present disclosure has been made in order to accomplish the above-described task. An object of the present disclosure is to accurately calculate a charge reserve capacity of a negative electrode in a battery system including a nickel-metal hydride battery and by a method of controlling the battery system.

A battery system of the present disclosure includes: a nickel-metal hydride battery; and a controller that controls charging and discharging of the nickel-metal hydride battery. The controller calculates a discharge electricity amount showing an integrated value of a current discharged from the nickel-metal hydride battery, and further calculates a state of charge (SOC) variation range ($\Delta$SOC) of the nickel-metal hydride battery in a prescribed time period. Then, the controller calculates a charge reserve capacity of the nickel-metal hydride battery based on a temperature of the nickel-metal hydride battery (hereinafter referred to as a "battery temperature"), the discharge electricity amount, and the SOC variation range.

Further, a method of controlling a battery system according to the present disclosure is a method of controlling a battery system including a nickel-metal hydride battery. The method includes: calculating a discharge electricity amount showing an integrated value of a current discharged from the nickel-metal hydride battery; calculating an SOC variation range ($\Delta$SOC) of the nickel-metal hydride battery in a prescribed time period; and calculating a charge reserve capacity of the nickel-metal hydride battery based on a battery temperature, the discharge electricity amount, and the SOC variation range.

The battery system and the method of controlling the battery system as described above focus on the dependence of the charge reserve capacity of the negative electrode not only on the battery temperature but also on the discharge electricity amount and the SOC variation range, to calculate the charge reserve capacity based on the battery temperature, the discharge electricity amount, and the SOC variation range. For example, the correlation of the charge reserve capacity with the battery temperature, the discharge electricity amount, and the SOC variation range is obtained in advance by a preliminary test, so that the charge reserve capacity can be calculated based on the battery temperature, the discharge electricity amount, and the SOC variation range. Thus, according to the battery system and the method of controlling the battery system as described above, the charge reserve capacity can be accurately calculated.

The controller may perform control to suppress a decrease in the charge reserve capacity when the charge reserve capacity decreases below a threshold value.

Further, the method may further include performing control to suppress a decrease in the charge reserve capacity when the charge reserve capacity decreases below a threshold value.

According to the battery system and the method of controlling the battery system as described above, when the charge reserve capacity decreases, such a decrease is suppressed, so that the performance deterioration in the battery can be suppressed.

The controller may control charging and discharging of the nickel-metal hydride battery to reduce the SOC variation range to be smaller when the charge reserve capacity decreases below the threshold value than when the charge reserve capacity dose not decrease below the threshold value.

For example, the controller may raise a control lower limit of an SOC of the nickel-metal hydride battery to reduce the SOC variation range to be smaller when the charge reserve capacity decreases below the threshold value than when the charge reserve capacity dose not decrease below the threshold value.

Further, the performing control in the method may include controlling charging and discharging of the nickel-metal hydride battery to reduce the SOC variation range to be smaller when the charge reserve capacity decreases below the threshold value than when the charge reserve capacity dose not decrease below the threshold value.

For example, the performing control may include raising a control lower limit of an SOC of the nickel-metal hydride battery to reduce the SOC variation range to be smaller when the charge reserve capacity decreases below the threshold value than when the charge reserve capacity dose not decrease below the threshold value.

According to the battery system and the method of controlling the battery system as described above, the charging and discharging power of the battery is not restricted, and therefore, any performance deterioration in a load driving device transmitting and receiving electric power to and from the battery can be suppressed.

The controller may calculate a first amount of increase in discharge reserve capacity using a previously obtained correlation among the battery temperature, time, and an amount of increase in a discharge reserve capacity of the nickel-metal hydride battery, wherein the first amount of increase in discharge reserve capacity shows the amount of increase resulting from the battery temperature and the time. Further, the controller may calculate a second amount of increase in discharge reserve capacity using a previously obtained correlation of the amount of increase in the discharge reserve capacity with the battery temperature, the discharge electricity amount, and the SOC variation range, wherein the second amount of increase in discharge reserve capacity shows the amount of increase in the discharge reserve capacity resulting from the battery temperature, the discharge electricity amount, and the SOC variation range. Further, the controller may correct an amount of decrease in the discharge reserve capacity with a previously obtained coefficient, to calculate the amount of decrease corrected by a negative electrode SOC of the nickel-metal hydride battery, wherein the amount of decrease in the discharge reserve capacity is calculated from the battery temperature and time using a previously obtained correlation among the battery temperature, the time, and the amount of decrease in the discharge reserve capacity, and wherein the previously obtained coefficient is higher in value as the negative electrode SOC of the nickel-metal hydride battery is higher. Further, the controller may calculate the discharge reserve capacity of the nickel-metal hydride battery by subtracting the corrected amount of decrease in the discharge reserve capacity from a total amount of increase in discharge reserve capacity, wherein the total amount of increase in discharge reserve capacity is obtained by adding the second amount of increase in discharge reserve capacity to the first amount of increase in discharge reserve capacity. Further, the controller may calculate a negative electrode capacity of the nickel-metal hydride battery by subtracting an amount of decrease in the negative electrode capacity from an initial negative electrode capacity in an initial state of the nickel-metal hydride battery, wherein the amount of decrease in the negative electrode capacity is calculated using a previously obtained correlation between the total amount of increase in discharge reserve capacity and the amount of decrease in the negative electrode capacity of the nickel-metal hydride battery. Further, the controller may calculate a positive electrode capacity of the nickel-metal hydride battery by subtracting an amount of decrease in the positive electrode capacity from an initial positive electrode capacity in the initial state of the nickel-metal hydride battery, wherein the amount of decrease in the positive electrode capacity is calculated using a previously obtained correlation between the discharge electricity amount and the amount of decrease in the positive electrode capacity of the nickel-metal hydride battery. Further, the controller may calculate the charge reserve capacity by subtracting the positive electrode capacity and the discharge reserve capacity from the negative electrode capacity.

Further, the calculating the charge reserve capacity in the method may include: calculating a first amount of increase in discharge reserve capacity using a previously obtained correlation among the battery temperature, time, and an amount of increase in a discharge reserve capacity of the nickel-metal hydride battery, wherein the first amount of increase in discharge reserve capacity shows the amount of increase resulting from the battery temperature and the time; calculating a second amount of increase in discharge reserve capacity using a previously obtained correlation of the amount of increase in the discharge reserve capacity with the battery temperature, the discharge electricity amount, and the SOC variation range, wherein the second amount of increase in discharge reserve capacity shows the amount of increase resulting from the battery temperature, the discharge electricity amount, and the SOC variation range; correcting an amount of decrease in the discharge reserve capacity with a previously obtained coefficient to calculate the amount of decrease corrected by a negative electrode SOC of the nickel-metal hydride battery, wherein the amount of decrease in the discharge reserve capacity is calculated from the battery temperature and time using a previously obtained correlation among the battery temperature, the time, and the amount of decrease in the discharge reserve capacity, and wherein the previously obtained coefficient is higher in value as the negative electrode SOC of the nickel-metal hydride battery is higher; calculating the discharge reserve capacity of the nickel-metal hydride battery by subtracting the corrected amount of decrease in the discharge reserve capacity from a total amount of increase in discharge reserve capacity, wherein the total amount of increase in discharge reserve capacity is obtained by adding the second amount of increase in discharge reserve capacity to the first amount of increase in discharge reserve capacity; calculating a negative electrode capacity of the nickel-metal hydride battery by subtracting an amount of decrease in the negative electrode capacity from an initial negative electrode capacity in an initial state of the nickel-metal hydride battery, wherein the amount of decrease in the negative electrode capacity is calculated using a previously obtained correlation between the total amount of increase in discharge reserve capacity and the amount of decrease in the negative electrode capacity of the nickel-metal hydride battery; calculating a positive electrode capacity of the nickel-metal hydride battery by subtracting an amount of decrease in the positive electrode capacity from an initial positive electrode capacity in the initial state of the nickel-metal hydride battery, wherein the amount of decrease in the positive electrode capacity is calculated using a previously obtained correlation between the discharge electricity amount and the amount of decrease in the positive electrode capacity of the nickel-metal hydride battery; and calculating the charge reserve capacity by subtracting the positive electrode capacity and the discharge reserve capacity from the negative electrode capacity.

According to the battery system and the method of controlling the battery system, the negative electrode capacity, the positive electrode capacity, and the discharge reserve capacity are calculated as described above, and the charge reserve capacity is calculated using these calculation results. Thus, the charge reserve capacity can be accurately calculated.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 is a diagram showing an example of a map illustrating a correlation of the charge reserve capacity with a battery temperature, a discharge electricity amount, and ΔSOC.

FIG. 24 is a flowchart illustrating an example of a procedure of a charge reserve capacity calculation process executed in step S140 in FIG. 23.

DESCRIPTION OF THE PREFERRED EMBODIMENTS

Figure 1:
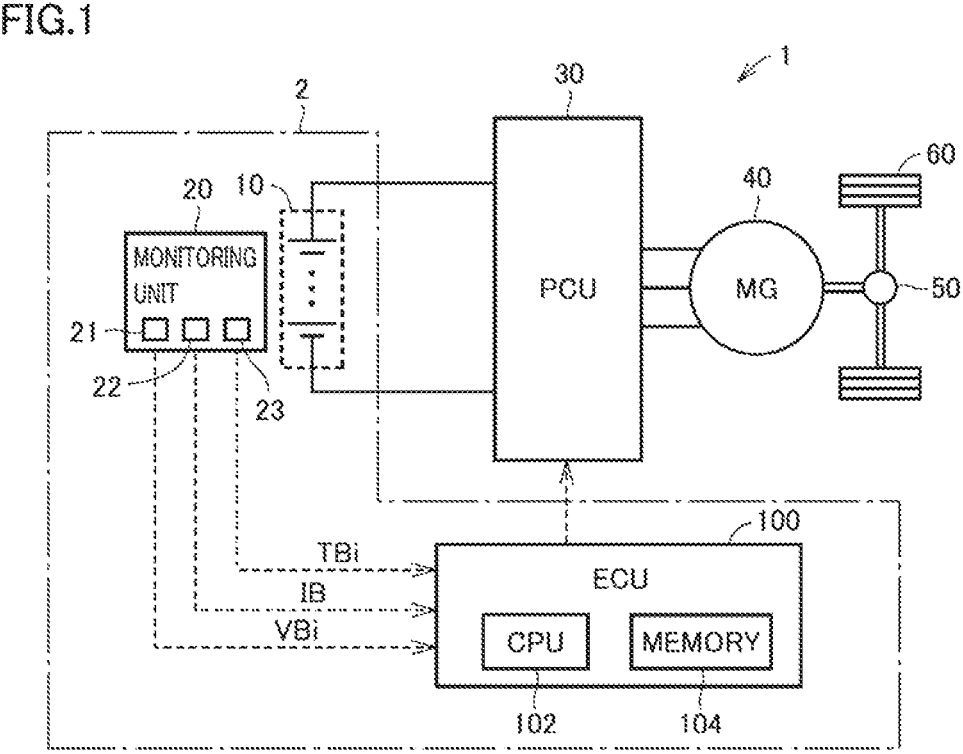
FIG. 1 is a diagram schematically showing a configuration of a vehicle on which a battery system according to an embodiment of the present disclosure is mounted.

The following describes embodiments of the present disclosure in detail with reference to the accompanying drawings, in which the same or corresponding portions are denoted by the same reference characters, and the description thereof will not be repeated.

First Embodiment

<Configuration of Battery System>

FIG. 1 is a diagram schematically showing a configuration of a vehicle 1 on which a battery system according to the present disclosure is mounted. The following representatively describes the case where a vehicle 1 is an electric vehicle (EV), but the battery system of the present disclosure is not limited to a battery system mounted on an EV, and may be mounted on a hybrid vehicle (HV), a fuel cell vehicle (FCV), or the like, and may also be applicable to any intended use other than vehicles.

Referring to FIG. 1, vehicle 1 includes a battery system 2, a power control unit (hereinafter referred to as a "PCU") 30, a motor generator (hereinafter referred to as an "MG") 40, a transmission gear 50, and driving wheels 60. Battery system 2 includes a battery pack 10, a monitoring unit 20, and an electronic control unit (hereinafter referred to as an "ECU") 100.

Battery pack 10 includes a large number of nickel-metal hydride cells (hereinafter simply referred to as "batteries" or "cells"). Specifically, a plurality of cells are integrated to form a module, and a plurality of modules are electrically connected to each other to form battery pack 10. Battery pack 10 stores electric power used for driving MG 40, and can supply the electric power to MG 40 through PCU 30. Upon generation of electric power by MG 40, battery pack 10 is charged with the electric power received through PCU 30.

Monitoring unit 20 includes a voltage sensor 21, a current sensor 22, and a temperature sensor 23. Voltage sensor 21 detects a voltage VBi in each cell of battery pack 10 (this voltage may be hereinafter referred to as a "battery voltage"). Current sensor 22 detects a charging and discharging current IB of battery pack 10 (this current may be hereinafter referred to as a "battery current"). In the present first embodiment, current sensor 22 detects the discharging current as a positive value and detects the charging current as a negative value. Temperature sensor 23 detects a temperature TBi in each cell (this temperature may be hereinafter also referred to as a "battery temperature"). Each sensor outputs a signal showing the detection result to ECU 100.

Voltage sensor 21 and temperature sensor 23 may detect the voltages and the temperatures, respectively, of a plurality of (for example, several) cells as a unit to be monitored. In this case, the voltage in each cell (an average value) can be calculated by dividing the detected values of the voltages in a plurality of cells by the number of cells.

PCU 30 performs bidirectional power conversion between battery pack 10 and MG 40 according to a control signal from ECU 100. PCU 30 includes, for example, an inverter that drives MG 40 and a converter that raises the direct-current (DC) voltage, which is supplied to the inverter, to be equal to or higher than the voltage output from battery pack 10.

MG 40 is representatively an alternating-current (AC) rotating electric machine, and, for example, a three-phase AC synchronous electric motor in which a permanent magnet is embedded in a rotor. MG 40 is driven by PCU 30 to generate rotational driving force, which is then transmitted to driving wheel 60 through transmission gear 50. On the other hand, during braking of vehicle 1, MG 40 operates as a generator to perform regenerative power generation. The electric power generated by MG 40 is supplied to battery pack 10 through PCU 30.

ECU 100 includes a central processing unit (CPU) 102, a memory (a read only memory (ROM) and a random access memory (RAM)) 104, and an input/output port (not shown) through which various signals are input/output. ECU 100 controls PCU 30 based on each sensor signal received from monitoring unit 20 and the programs and maps stored in memory 104, to thereby control driving of MG 40 and charging and discharging of battery pack 10.

ECU 100 calculates an SOC of the battery (cell) (which may be hereinafter referred to as a "battery SOC") based on each sensor signal from monitoring unit 20. The SOC can be calculated using various known methods such as a method using an open circuit voltage (OCV)-SOC curve (a map or the like) showing the relation between the OCV and the SOC, and a method using an integrated value of the charging and discharging currents.

Further, ECU 100 calculates the charge reserve capacity of the battery. Then, when the charge reserve capacity decreases below a threshold value, ECU 100 performs control for suppressing a decrease in the charge reserve capacity. The charge reserve capacity, the method of calculating the charge reserve capacity, and the control for suppressing a decrease in the charge reserve capacity will be described later in detail.

Figure 2:
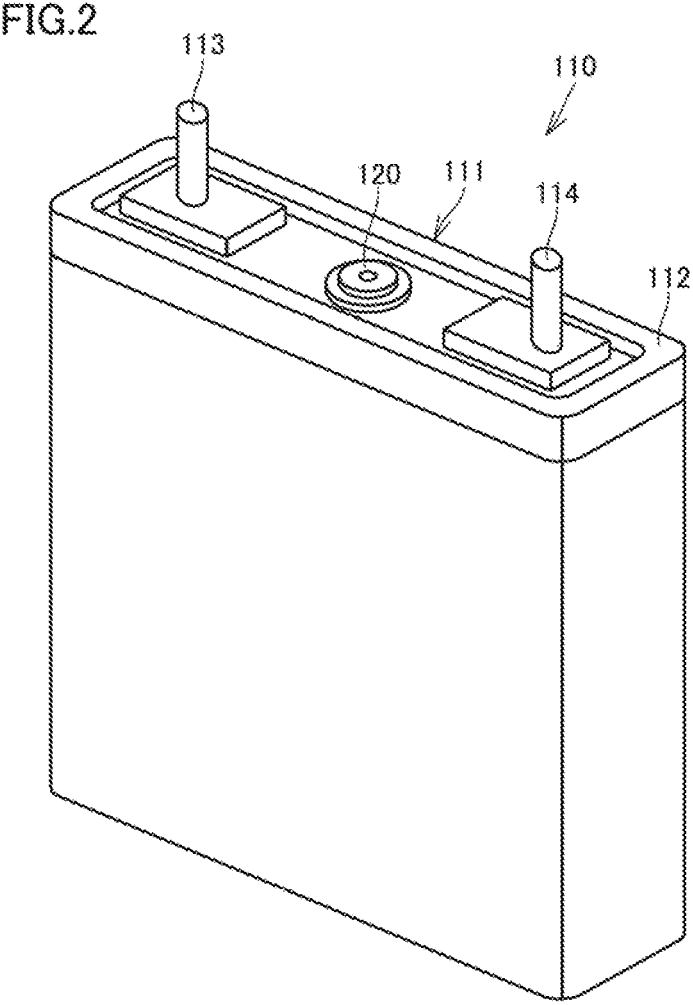
FIG. 2 is a diagram showing a configuration example of a battery included in a battery pack.

FIG. 2 is a diagram showing a configuration example of a battery included in battery pack 10. Referring to FIG. 2, the upper surface of a case 111 of battery 110 is sealed by a lid 112. Case 111 and lid 112 each are formed of a resin, for example.

Lid 112 is provided with a positive electrode terminal 113 and a negative electrode terminal 114. Positive electrode terminal 113 and negative electrode terminal 114 each have: one end protruding outward from lid 112; and the other end electrically connected to a corresponding one of an internal positive electrode terminal and an internal negative electrode terminal (each of which is not shown) inside case 111.

Lid 112 is further provided with a safety valve 120. Safety valve 120 is configured to open when the pressure inside battery 110 rises. When the internal pressure in the battery rises and safety valve 120 opens, the gas and the electrolytic solution inside the battery are partially discharged to the outside.

An electrode body (not shown) is accommodated in case 111. The electrode body is formed, for example, by stacking a positive electrode sheet and a negative electrode sheet with a separator interposed therebetween. The positive electrode sheet includes a collector plate and a positive electrode active material layer formed on the surface of the collector plate. The negative electrode sheet includes a collector plate and a negative electrode active material layer formed on the surface of the collector plate. The positive electrode active material layer contains a positive electrode active material such as nickel hydroxide. The negative electrode active material layer contains a hydrogen storage alloy as a negative electrode active material. The positive electrode active material layer, the negative electrode active material layer, and the separator each contain an electrolytic solution that is a highly alkaline solution.

The following describes the charge reserve capacity of the battery, the method of calculating the charge reserve capacity, and the control for suppressing a decrease in the charge reserve capacity.

<Description of Charge Reserve Capacity>

A nickel-metal hydride battery is generally designed such that the negative electrode is larger in capacity than the positive electrode, and the negative electrode capacity includes: a charge reserve capacity as an uncharged portion that is chargeable with electric power even after the battery is fully charged; and a discharge reserve capacity as a charged portion from which electric power can be discharged even after the battery is fully discharged.

Figure 3:
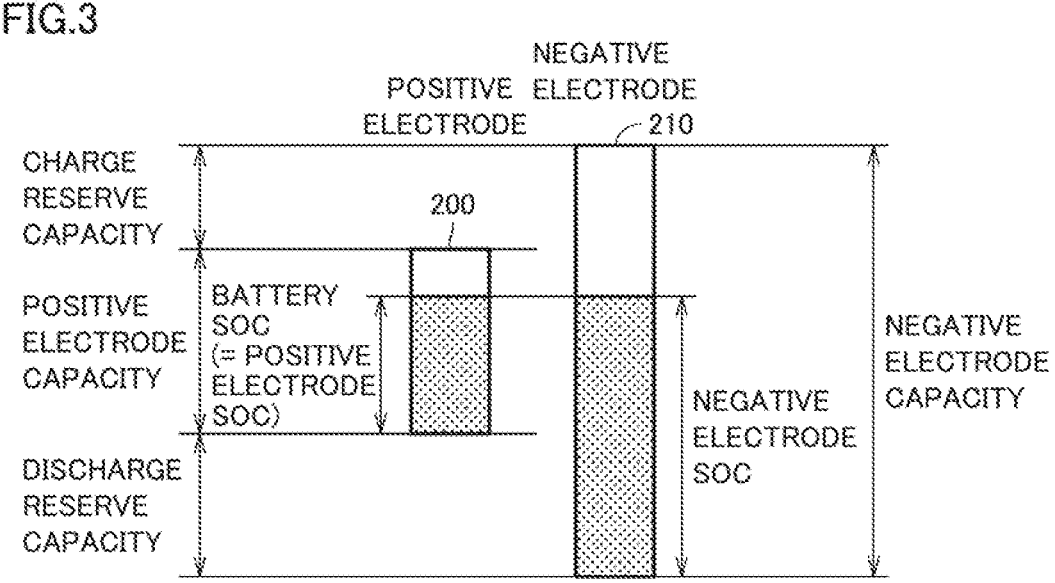
FIG. 3 is a conceptual diagram of capacities of a positive electrode and a negative electrode in a nickel-metal hydride battery.

FIG. 3 is a conceptual diagram of capacities of the positive electrode and the negative electrode in the nickel-metal hydride battery. Referring to FIG. 3, the length of a left vertical frame 200 shows the capacity of the positive electrode while the length of a right vertical frame 210 shows the capacity of the negative electrode. As described above, the nickel-metal hydride battery is designed such that the negative electrode capacity is larger than the positive electrode capacity. The shaded portion in vertical frame 200 shows a positive electrode SOC that is a proportion of the charged portion in the positive electrode to the positive electrode capacity. The shaded portion in vertical frame 210 shows a negative electrode SOC that is a proportion of the charged portion in the negative electrode to the negative electrode capacity.

Since the negative electrode capacity is larger than the positive electrode capacity, the capacity of the battery is determined by the positive electrode capacity, and thus, the positive electrode SOC represents the battery SOC showing the state of charge of the battery. The remaining capacity in the negative electrode with 0% of the battery SOC represents the discharge reserve capacity. The capacity of the uncharged portion in the negative electrode with 100% (fully charged) of the battery SOC represents the charge reserve capacity.

The charge reserve capacity and the discharge reserve capacity are set in accordance with the deterioration state of the negative electrode. When charging and discharging of the battery causes deterioration (oxidation) in the hydrogen storage alloy of the negative electrode, the charge reserve capacity decreases, for example, due to a decrease in the negative electrode capacity. When the charge reserve capacity decreases, the negative electrode generates hydrogen gas at the time of overcharging or the like, and the internal pressure in the battery rises. When the internal pressure in the battery rises to a prescribed level, safety valve 120 (FIG. 2) opens to discharge gas to the outside of the battery. At this time, the electrolytic solution inside the battery is also discharged to the outside together with the gas. As a result, the electrolytic solution decreases, and thereby, the performance of the battery lowers (deteriorates).

Thus, in battery system 2 according to the present first embodiment, the charge reserve capacity is accurately calculated. When the calculated charge reserve capacity decreases to a threshold value, such a decrease in the charge reserve capacity is controlled to be suppressed. The threshold value of the charge reserve capacity is appropriately set to be relatively small so as to prevent excessive execution of the above-mentioned control, but to attain a level at which safety valve 120 does not open even when the internal pressure in the battery rises due to a decrease in the charge reserve capacity. The control for suppressing a decrease in the charge reserve capacity will be described later.

It has been known that the negative electrode reserve capacity depends on the battery temperature (for example, see the above-mentioned Japanese Patent Laying-Open No. 2014-87218), and the charge reserve capacity also depends on the battery temperature. Thus, the present first embodiment focuses on the dependence of the charge reserve capacity also on the discharge electricity amount and the SOC variation range (hereinafter referred to as "$\Delta$SOC") of the battery. The discharge electricity amount is an integrated value of the discharging current of the battery, and also is a cumulative value of the discharging current from the initial state. In this case, $\Delta$SOC is a variation range of the battery SOC in a certain time period (for example, several tens of minutes).

Figure 4:
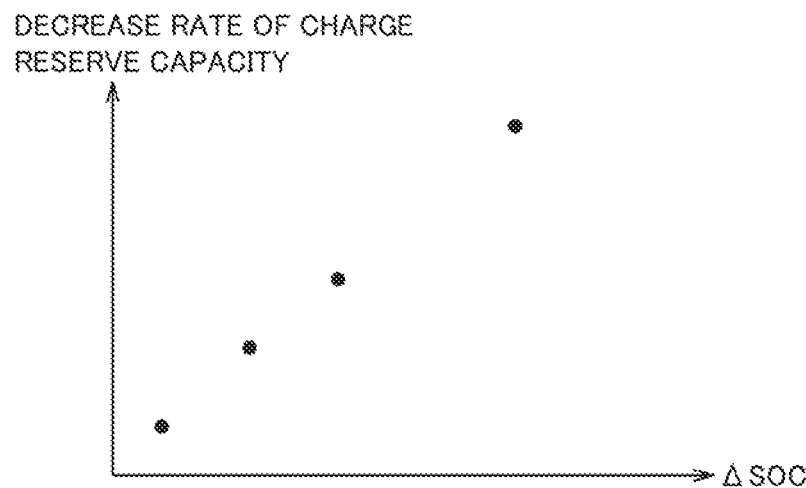
FIG. 4 is a diagram showing the relation between ΔSOC and a decrease rate of a charge reserve capacity.

FIG. 4 is a diagram showing the relation between $\Delta$SOC and a decrease rate of the charge reserve capacity. Referring to FIG. 4, as the $\Delta$SOC is larger, the decrease rate of the charge reserve capacity is higher. Accordingly, it can be understood that the charge reserve capacity depends on the $\Delta$SOC.

Figure 5:
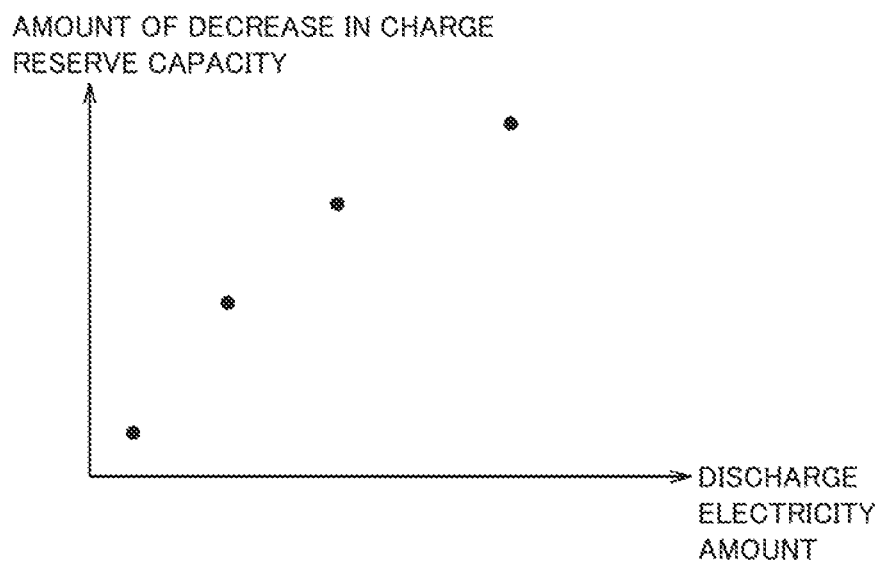
FIG. 5 is a diagram showing the relation between a discharge electricity amount of the battery and an amount of decrease in a charge reserve capacity.

FIG. 5 is a diagram showing the relation between the discharge electricity amount of the battery and an amount of decrease in the charge reserve capacity. Referring to FIG. 5, as the discharge electricity amount increases, the amount of decrease in the charge reserve capacity increases (the charge reserve capacity decreases). Accordingly, it can be understood that the charge reserve capacity depends on the discharge electricity amount.

Thus, in battery system 2 according to the present first embodiment, the charge reserve capacity of the battery is calculated from the battery temperature, the discharge electricity amount, and the $\Delta$SOC. In the present first embodiment, the correlation of the charge reserve capacity with the battery temperature, the discharge electricity amount, and the $\Delta$SOC is obtained in advance by a preliminary test or the like, and stored in memory 104 as a map. Then, based on this map, the charge reserve capacity is calculated from the battery temperature, the discharge electricity amount, and the $\Delta$SOC.

FIG. 6 is a diagram showing an example of a map illustrating the correlation of the charge reserve capacity with the battery temperature, the discharge electricity amount, and the $\Delta$SOC. Referring to FIG. 6, the map contains charge reserve capacities (D11, D12, D21, . . . ) for each combination of discharge electricity amounts (E1, E2, . . . ) and $\Delta$SOC (S1, S2, . . . ) at each of battery temperatures (T1, T2, . . . ). The charge reserve capacities (D11, D12, D21, . . . ) represent values obtained by a preliminary test or the like.

In the present first embodiment, the map as described above is created in advance and stored in memory 104 of ECU 100. Then, the above-mentioned map is referred to during use of battery pack 10 (for example, while the system of vehicle 1 operates) to thereby calculate the charge reserve capacity.

Further, in the present first embodiment, when the charge reserve capacity decreases below the threshold value, the control for suppressing a decrease in the charge reserve capacity is performed, as described above. In battery system 2 according to the present first embodiment, based on the relation between the $\Delta$SOC and the charge reserve capacity, the control lower limit of the battery SOC is raised to reduce the $\Delta$SOC to be smaller when the charge reserve capacity decreases below the threshold value than when the charge reserve capacity does not decrease below the threshold value, and thereby, the decrease in the charge reserve capacity is suppressed.

Instead of raising the control lower limit of the battery SOC, the control lower limit of the battery SOC may be raised and the control upper limit of the battery SOC may be lowered, to thereby reduce the $\Delta$SOC.

In order to suppress a decrease in the charge reserve capacity, the charging and discharging power for battery pack 10 may be suppressed to thereby suppress the battery temperature. Alternatively, based on the relation between the discharge electricity amount and the charge reserve capacity, the current discharged from battery pack 10 may be suppressed, and thereby, a decrease in the charge reserve capacity can also be suppressed. According to these methods, the charging and discharging power of battery pack 10 is suppressed, and thus, the performance of MG 40 to drive vehicle 1 decreases. On the other hand, according to the present first embodiment, the charging and discharging power of battery pack 10 is not directly restricted, and thus, deterioration in driving performance for vehicle 1 can be suppressed.

Figure 7:
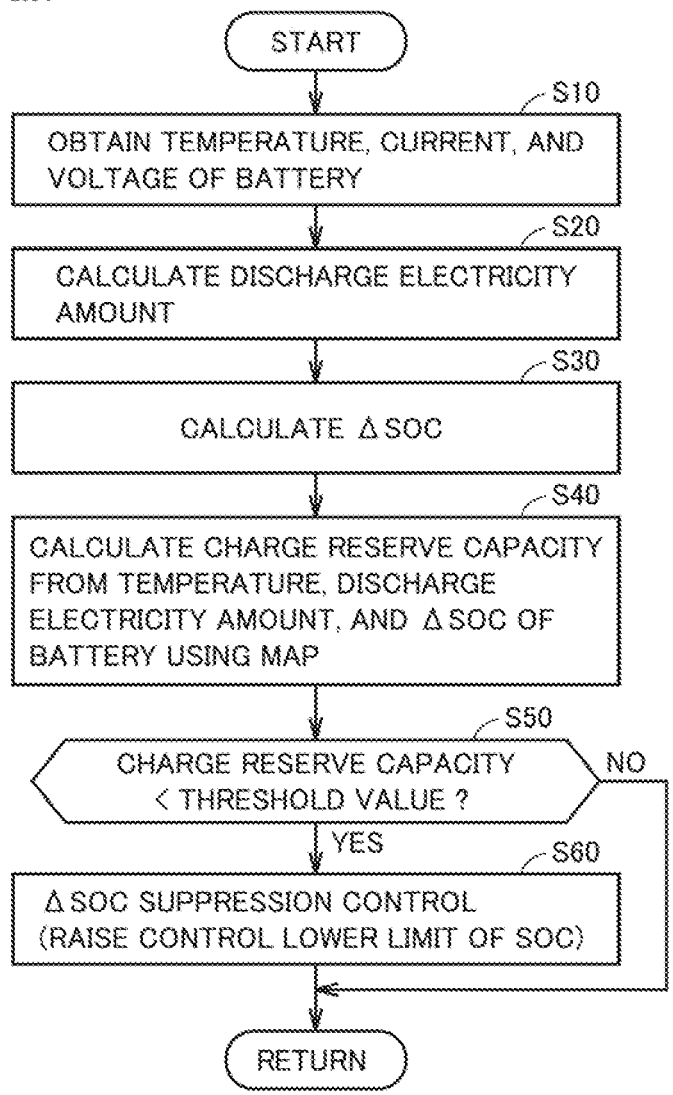
FIG. 7 is a flowchart illustrating an example of a procedure of a process executed by an ECU.

FIG. 7 is a flowchart illustrating an example of a procedure of a process executed by ECU 100. This flowchart illustrates the process related to calculation of the charge reserve capacity and suppression of a decrease in the charge reserve capacity among various processes executed by ECU 100. The process shown in this flowchart is repeatedly performed while the system of vehicle 1 operates.

Referring to FIG. 7, ECU 100 obtains detected values of temperature TBi, current IB, and voltage VBi of each battery from temperature sensor 23, current sensor 22, and voltage sensor 21, respectively, in monitoring unit 20 (step S10).

Then, ECU 100 calculates the discharge electricity amount using current IB for each battery (step S20). Specifically, when current IB is a positive value (discharge), ECU 100 integrates current IB (discharging current). When current IB is a negative value (charge), ECU 100 calculates the discharge electricity amount without integrating the current.

Further, ECU 100 calculates $\Delta$SOC for each battery (step S30). Specifically, ECU 100 calculates $\Delta$SOC by subtracting the minimum value of the battery SOC from the maximum value of the battery SOC in a certain time period (for example, several tens of minutes). In the above description, the $\Delta$SOC in such a certain time period is calculated in each calculation cycle, but the $\Delta$SOC may be calculated in each certain time period as mentioned above. The discharge electricity amount and the $\Delta$SOC may be calculated in the opposite order.

Then, ECU 100 refers to the map (FIG. 6) stored in memory 104 to calculate, for each battery, the charge reserve capacity corresponding to temperature TBi of the battery acquired in step S10, and the discharge electricity amount and the $\Delta$SOC calculated in steps S20 and S30, respectively (step S40).

Then, ECU 100 determines whether the calculated charge reserve capacity is lower than a threshold value or not (step S50). As described above, the threshold value is appropriately set to be relatively small so as to prevent excessive execution of $\Delta$SOC suppression control in step S60 (described later), but to attain a level at which safety valve 120 (FIG. 2) does not open even when the internal pressure in the battery rises due to a decrease in the charge reserve capacity.

When it is determined in step S50 that the charge reserve capacity is lower than the threshold value (YES in step S50), ECU 100 performs ΔSOC suppression control (step S60). This ΔSOC suppression control is performed for suppressing a decrease in the charge reserve capacity by reducing the ΔSOC. In the present first embodiment, the control lower limit of the battery SOC is raised to reduce the ΔSOC as compared with the case where the charge reserve capacity does not decrease below the threshold value.

On the other hand, when it is determined in step S50 that the charge reserve capacity is equal to or greater than the threshold value (NO in step S50), ECU 100 advances the process to return without performing the ΔSOC suppression control. In other words, the control lower limit of the battery SOC is not raised unless the charge reserve capacity decreases below the threshold value.

In the above description, a plurality of threshold values may be set in a stepwise manner, and the control lower limit of the SOC may be raised in a stepwise manner each time the charge reserve capacity decreases below the threshold value.

As described above, the present first embodiment focuses on the dependence of the charge reserve capacity of the negative electrode not only on the battery temperature but also on the discharge electricity amount and the ΔSOC, to calculate the charge reserve capacity from the battery temperature, the discharge electricity amount, and the ΔSOC. In the present first embodiment, the correlation of the charge reserve capacity with the battery temperature, the discharge electricity amount, and the ΔSOC is obtained in advance by a preliminary test and stored in memory 104 as a map. Then, the charge reserve capacity is calculated from the battery temperature, the discharge electricity amount, and the ΔSOC. Therefore, according to the present first embodiment, the charge reserve capacity can be accurately calculated.

Further, in the present first embodiment, when the charge reserve capacity decreases below the threshold value, such a decrease in the charge reserve capacity is controlled to be suppressed. Thereby, when the charge reserve capacity decreases, such a decrease is suppressed, with the result that performance deterioration in the battery can be suppressed.

In the present first embodiment, for controlling suppression of a decrease in the charge reserve capacity, charging and discharging of the battery is controlled to reduce the ΔSOC as compared with the case where the charge reserve capacity does not decrease below the threshold value. Specifically, the control lower limit of the SOC is raised to thereby reduce the ΔSOC. This prevents direct restriction of the charging and discharging power of the battery, so that deterioration in performance for traveling by PCU 30 and MG 40 can be suppressed.

Second Embodiment

In the first embodiment, the correlation of the charge reserve capacity with the battery temperature, the discharge electricity amount, and the ΔSOC is obtained in advance by a preliminary test and stored in memory 104 as a map. Then, based on this map, the charge reserve capacity is calculated. In the present second embodiment, the charge reserve capacity is calculated using a model.

Referring again to FIG. 3, the charge reserve capacity can be calculated according to the following equation.

Charge reserve capacity=negative electrode capacity−positive electrode capacity−discharge reserve capacity (1)

Thus, in the present second embodiment, the negative electrode capacity, the positive electrode capacity, and the discharge reserve capacity of the battery are calculated, and the charge reserve capacity is calculated according to the equation (1). The following describes a method of calculating each of the negative electrode capacity, the positive electrode capacity, and the discharge reserve capacity. Since the discharge reserve capacity is used for calculating the negative electrode capacity, calculation of this discharge reserve capacity will be first described.

<Calculation of Discharge Reserve Capacity>

The discharge reserve capacity can be calculated from: the amount of increase resulting from corrosion of the hydrogen storage alloy in the negative electrode (self-charge of hydrogen) (which will be hereinafter referred to as a "term a"); and the amount of decrease resulting from permeation of hydrogen from a container (case 111) of the battery (permeation through the container is allowed due to small hydrogen molecules) (which will be hereinafter referred to as a "term b").

Discharge reserve capacity=term $a$−term $b$ (2)

Term a: the amount of increase resulting from corrosion of the alloy in the negative electrode (self-charge of hydrogen)

Figure 8:
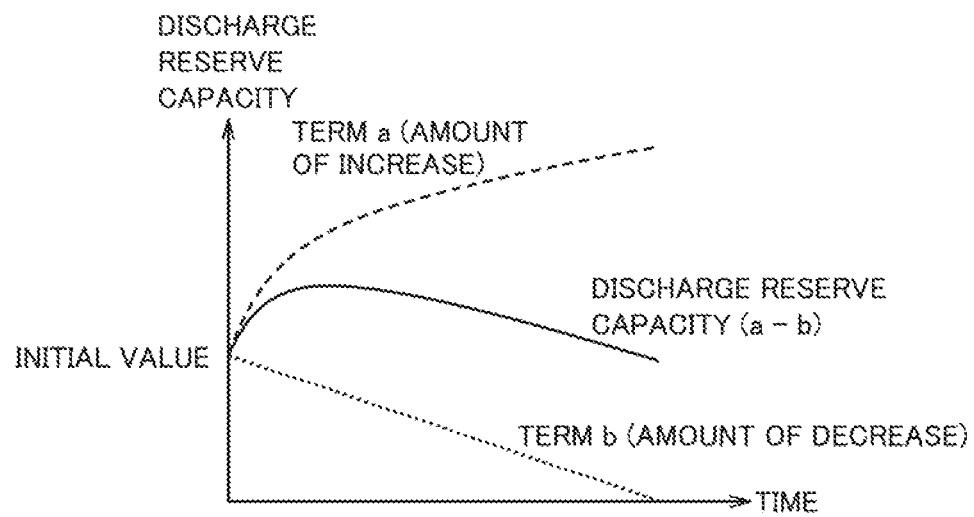
FIG. 8 is a diagram showing an example of transition of a discharge reserve capacity.

Term b: the amount of decrease resulting from permeation of hydrogen from the container FIG. 8 is a diagram showing an example of transition of the discharge reserve capacity. FIG. 8 also shows each of term a (the amount of increase) and term b (the amount of decrease). The following specifically describes calculation of each of term a (the amount of increase) and term b (the amount of decrease).

Figure 9:
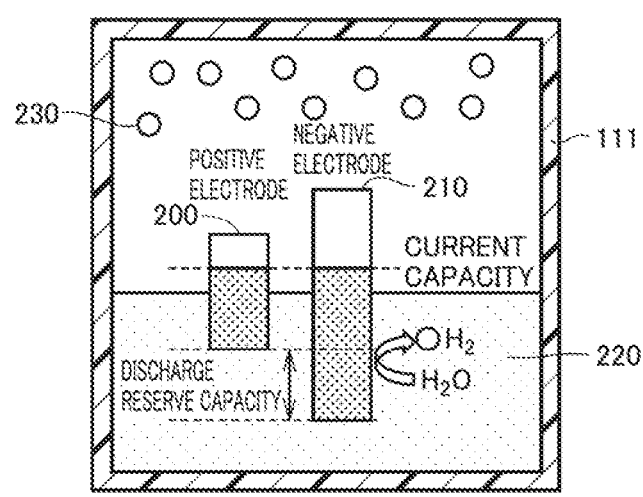
FIG. 9 is a conceptual diagram showing a positive electrode, a negative electrode, and the state inside the battery.

FIG. 9 is a conceptual diagram showing the positive electrode, the negative electrode, and the state inside the battery. Referring to FIG. 9, as described with reference to FIG. 3, the length of left vertical frame 200 shows the capacity of the positive electrode while the length of right vertical frame 210 shows the capacity of the negative electrode. Shaded portions in vertical frames 200 and 210 showing the positive electrode SOC and the negative electrode SOC, respectively, are drawn such that their upper ends are aligned with each other. In addition to these electrodes (electrode bodies), an electrolytic solution 220 and hydrogen gas 230 exist in case 111.

The discharge reserve capacity shows the remaining capacity in the negative electrode when the battery SOC (the positive electrode SOC) is zero, and is represented by the difference between the lower end of vertical frame 200 showing the positive electrode capacity and the lower end of vertical frame 210 showing the negative electrode capacity.

<Increase in Discharge Reserve Capacity>

The negative electrode made of a hydrogen storage alloy is combined with oxygen in the water component ($H_2O$) in the electrolytic solution and then oxidized, and thereby, damaged and consequently decreased in capacity. Such a decrease in the negative electrode capacity is represented in FIG. 9 by the reduced length of vertical frame 210 showing the negative electrode capacity. On the other hand, the remaining hydrogen is absorbed by the negative electrode, with the result that the discharge reserve capacity increases as described below.

Figure 10:
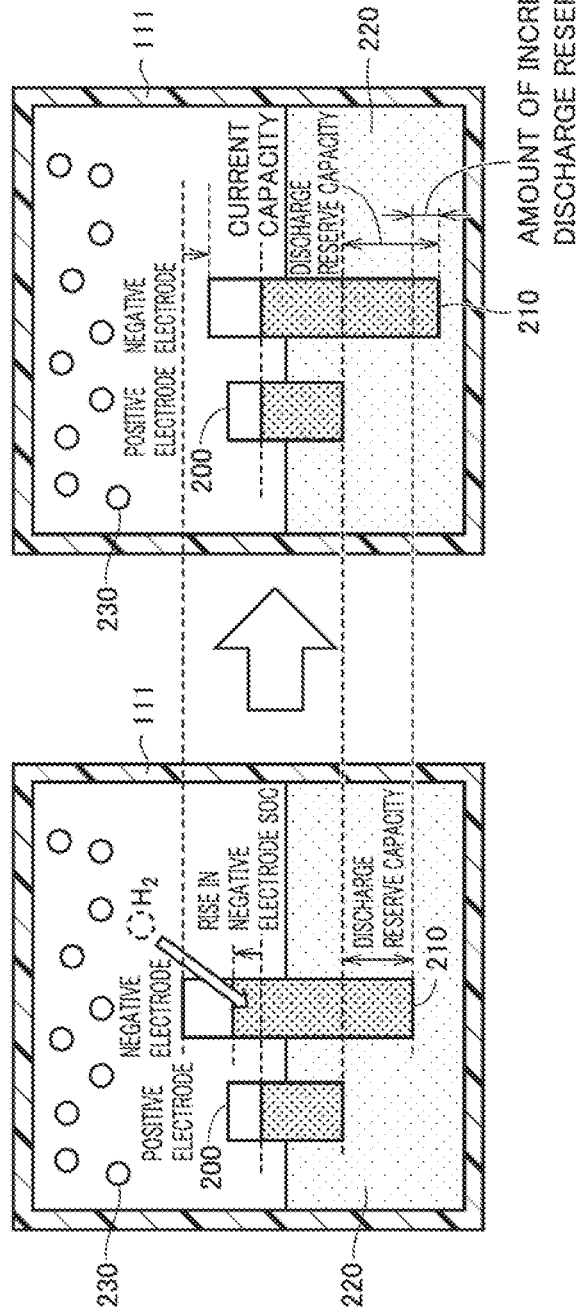
FIG. 10 is a diagram illustrating a mechanism by which the discharge reserve capacity increases.

FIG. 10 is a diagram illustrating a mechanism by which the discharge reserve capacity increases. Referring to the diagram on the left side in FIG. 10, hydrogen remaining due to oxidation of the negative electrode is absorbed by the negative electrode, and thereby, the amount of hydrogen contained in the negative electrode increases, so that the negative electrode SOC rises. Since the upper end of the negative electrode SOC is aligned with the upper end of the positive electrode SOC showing the battery SOC, vertical frame 210 showing the negative electrode capacity moves downward by the amount of rise in the negative electrode SOC, as shown in the diagram on the right side in FIG. 10. This consequently increases the discharge reserve capacity represented by the difference between the lower end of vertical frame 210 and the lower end of vertical frame 200 showing the positive electrode capacity.

In this way, the discharge reserve capacity increases due to corrosion (oxidation) of the alloy in the negative electrode. Thus, in the present second embodiment, the amount of increase (term a) in the discharge reserve capacity is calculated by adding the following two factors.

(i) Amount of Increase Irrespective of Charging and Discharging of Battery

Irrespective of charging and discharging of the battery, the reaction between the negative electrode and the electrolytic solution progresses, thereby increasing the discharge reserve capacity. In other words, the discharge reserve capacity increases over time even when the battery is left to stand. Thus, the amount of increase in the discharge reserve capacity that increases over time irrespective of charging and discharging will be hereinafter referred to as an "amount of increase in the discharge reserve capacity resulting from the battery left to stand".

Figure 11:
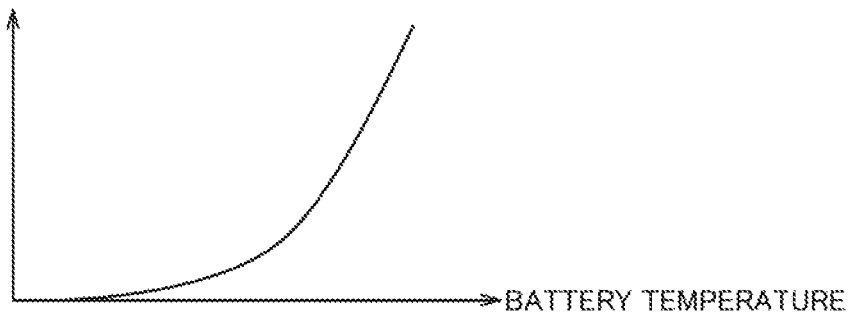
FIG. 11 is a diagram showing an example of the relation between the battery temperature and an amount of increase in the discharge reserve capacity resulting from the battery left to stand.

FIG. 11 is a diagram showing an example of the relation between the battery temperature and the amount of increase in the discharge reserve capacity resulting from the battery left to stand. Referring to FIG. 11, as temperature TBi of the battery is higher, the amount of increase in the discharge reserve capacity resulting from the battery left to stand is larger. Thus, in the present second embodiment, the amount of increase in the discharge reserve capacity resulting from the battery left to stand is calculated by the following equation, for example.

$$\text{Amount of increase in the discharge reserve capacity resulting from the battery left to stand} = a1 \times \exp(a2 \times TBi) \times \sqrt{(\text{time})} \quad (3)$$

Coefficients a1 and a2 are obtained in advance by a preliminary test and stored in memory 104.

(ii) Amount of Increase Resulting from Charging and Discharging of Battery

Figure 12:
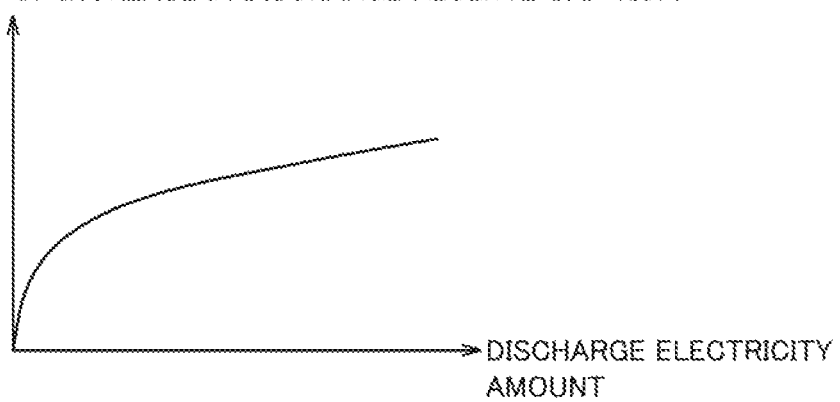
FIG. 12 is a diagram showing an example of the relation between the amount of increase in the discharge reserve capacity and the discharge electricity amount of the battery.

FIG. 12 is a diagram showing an example of the relation between the amount of increase in the discharge reserve capacity and the discharge electricity amount of the battery. Referring to FIG. 12, as the discharge electricity amount is larger, the amount of increase in the discharge reserve capacity is larger.

Figure 13:
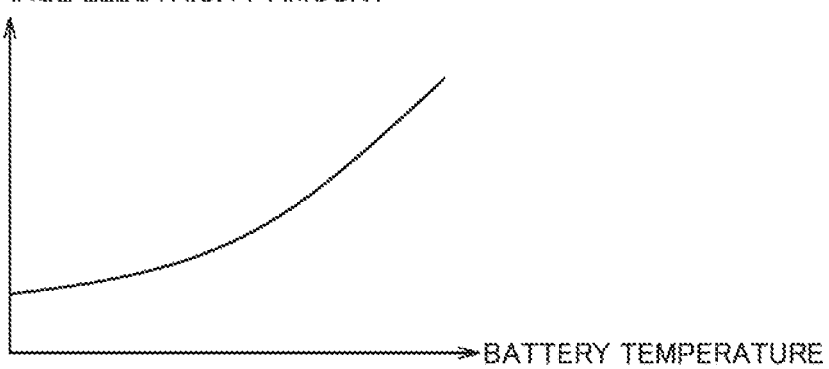
FIG. 13 is a diagram showing an example of the relation between the battery temperature and an amount of increase in the discharge reserve capacity resulting from charging and discharging.

FIG. 13 is a diagram showing an example of the relation between the battery temperature and the amount of increase in the discharge reserve capacity resulting from charging and discharging. In FIG. 13, in order to eliminate the influence of the discharge electricity amount, the vertical axis shows the value obtained by dividing the discharge reserve capacity by the square root of the discharge electricity amount. The reason why the square root of the discharge electricity amount is used is that the relation between the amount of increase in the discharge reserve capacity and the discharge electricity amount can be modeled by the square root of the discharge electricity amount, as will be described later. Referring to FIG. 13, as the temperature of the battery is higher, the amount of increase in the discharge reserve capacity is larger.

Figure 14:
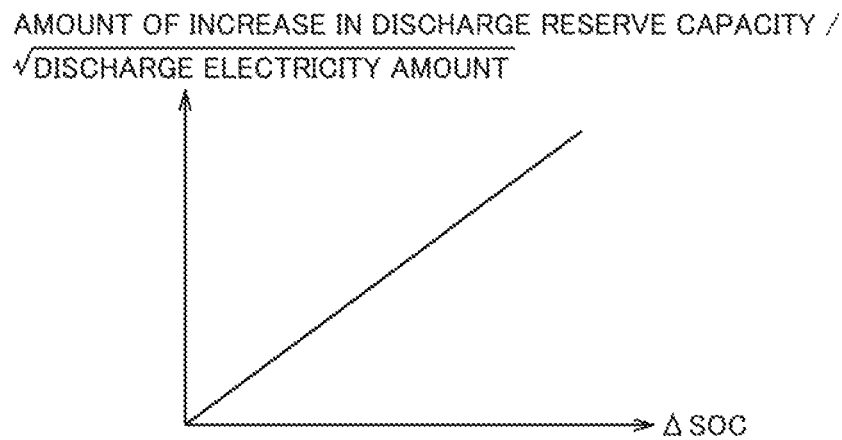
FIG. 14 is a diagram showing an example of the relation between the ΔSOC and the amount of increase in the discharge reserve capacity resulting from charging and discharging.

FIG. 14 is a diagram showing an example of the relation between the ΔSOC and the amount of increase in the discharge reserve capacity resulting from charging and discharging. Also in FIG. 14, the vertical axis shows the value obtained by dividing the discharge reserve capacity by the square root of the discharge electricity amount. Referring to FIG. 14, as the ΔSOC is larger, the amount of increase in the discharge reserve capacity is larger.

In this way, as the battery temperature is higher and the discharge electricity amount is larger, and also, as the ΔSOC is larger, the amount of increase in the discharge reserve capacity is larger. Thus, in the present second embodiment, the amount of increase in the discharge reserve capacity resulting from charging and discharging is calculated by the following equation, for example.

$$\text{Amount of increase in the discharge reserve capacity resulting from charging and discharging} = a3 \times \exp(a4 \times TBi) \times \sqrt{(\text{discharge electricity amount})} \times \Delta SOC \quad (4)$$

Coefficients a3 and a4 are obtained in advance by a preliminary test and stored in memory 104.

<Decrease in Discharge Reserve Capacity>

As hydrogen permeates through the container (case 111) and leaks from the container, hydrogen in the negative electrode decreases and the negative electrode SOC decreases. In the model in FIG. 9, the upper end of the negative electrode SOC aligns with the upper end of the positive electrode SOC showing the battery SOC. Thus, when the negative electrode SOC decreases, vertical frame 210 showing the negative electrode capacity moves upward. This consequently decreases the discharge reserve capacity represented by the difference between the lower end of vertical frame 210 and the lower end of vertical frame 200 showing the positive electrode capacity. Permeation of hydrogen from the container occurs irrespective of charging and discharging of the battery, and the amount of permeation is larger as the temperature of the battery is higher.

Figure 15:
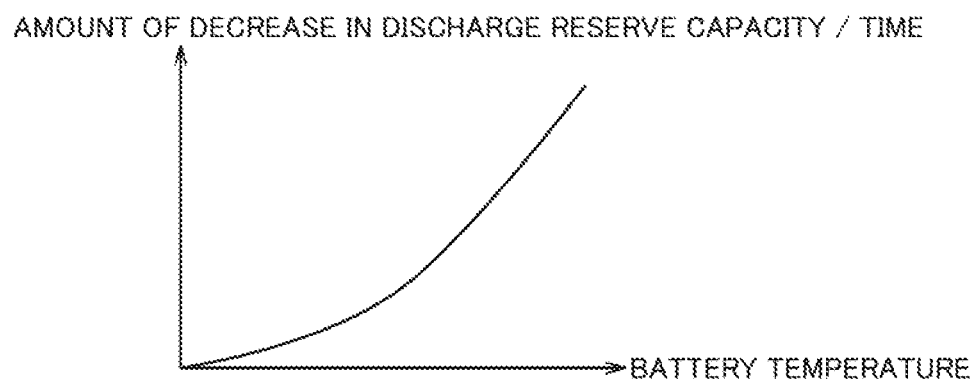
FIG. 15 is a diagram showing an example of the relation between an amount of decrease in the discharge reserve capacity and the battery temperature.

FIG. 15 is a diagram showing an example of the relation between the amount of decrease in the discharge reserve capacity and the battery temperature. In FIG. 15, in order to eliminate the influence of time, the vertical axis shows the value obtained by dividing the amount of decrease in the discharge reserve capacity by time. Referring to FIG. 15, as the temperature of the battery is higher, the amount of decrease in the discharge reserve capacity is larger.

As the negative electrode SOC is higher, the amount of hydrogen gas inside the battery becomes larger (the hydrogen equilibrium pressure becomes higher) and the amount of hydrogen permeating through the container becomes larger. Thus, in the present second embodiment, the amount of decrease in the discharge reserve capacity (term b) is calculated using the following equation that is corrected such that the amount of decrease in the discharge reserve capacity is larger as the negative electrode SOC is higher.

$$\text{Amount of decrease in the discharge reserve capacity} = b1 \times \exp(b2 \times TBi) \times \text{time} \times \text{correction coefficient} \quad (5)$$

Figure 16:
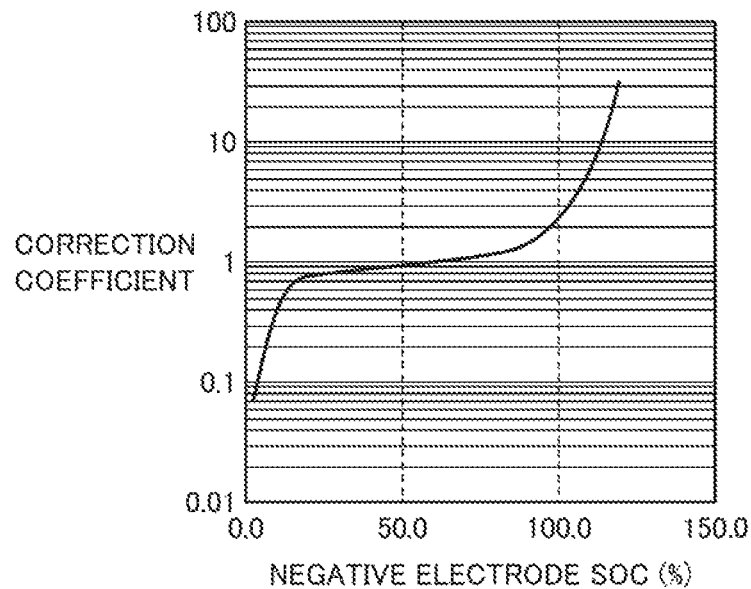
FIG. 16 is a diagram showing a correction coefficient by a negative electrode SOC.

In this case, the correction coefficient is a coefficient that is larger as the negative electrode SOC is higher, as illustrated in FIG. 16.

The negative electrode SOC can be calculated in the following manner. For example, the positive electrode capacity is first multiplied by the battery SOC (%) to obtain a multiplication result, to which the discharge reserve capacity is added to obtain an addition result, which is then divided by the negative electrode capacity, to thereby obtain the negative electrode SOC (see FIG. 3). The values of the positive electrode capacity, the battery SOC, the discharge reserve capacity, and the negative electrode capacity used in this case can be the calculation results obtained in the previous calculation cycle.

<Calculation of Negative Electrode Capacity>

As described above, the negative electrode is oxidized and thereby damaged, and thus, decreased in capacity. Since the above-mentioned term a calculated in the process of calculating the discharge reserve capacity corresponds to the amount of increase resulting from corrosion (oxidation) of the alloy in the negative electrode, the term a correlates with the amount of decrease in the negative electrode capacity.

Figure 17:
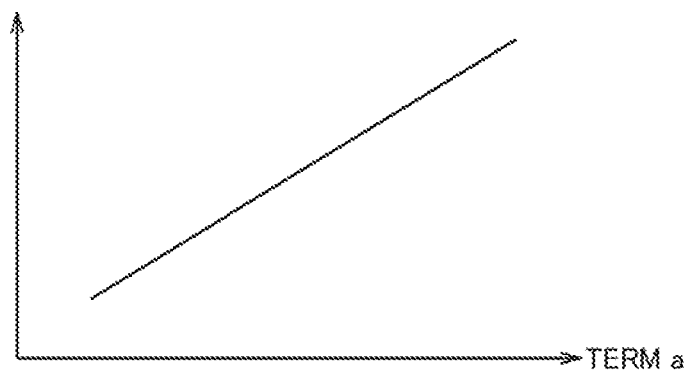
FIG. 17 is a diagram showing an example of the relation between the amount of increase in the discharge reserve capacity (term a) and the amount of decrease in a negative electrode capacity.

FIG. 17 is a diagram showing an example of the relation between the amount of increase in the discharge reserve capacity (term a) and the amount of decrease in the negative electrode capacity. FIG. 17 shows that, as the amount of increase in the discharge reserve capacity (term a) increases, the amount of decrease in the negative electrode capacity also increases. Thus, in the present second embodiment, the negative electrode capacity is calculated by the following equation.

$$\text{Negative electrode capacity} = \text{negative electrode capacity initial value} - c_1 \times \text{amount of increase in the discharge reserve capacity (term } a) \quad (6)$$

In this case, the negative electrode capacity initial value represents the negative electrode capacity in the initial state of the battery, and is measured or calculated in advance and stored in memory 104. A coefficient $c_1$ is also obtained in advance by a preliminary test and stored in memory 104.

<Calculation of Positive Electrode Capacity>

Figure 18:
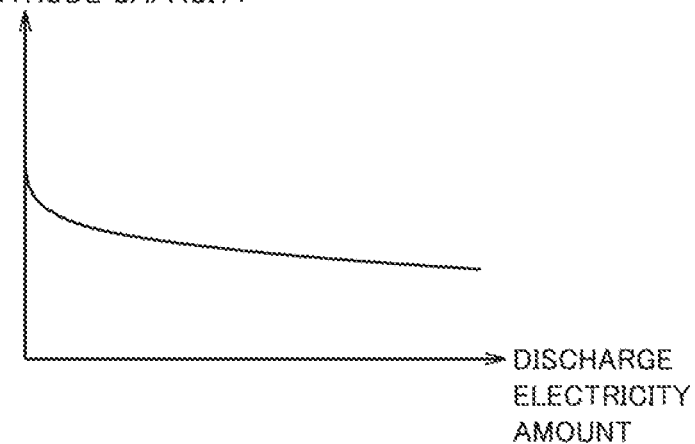
FIG. 18 is a diagram showing an example of the relation between the discharge electricity amount and a positive electrode capacity.

The positive electrode capacity decreases in accordance with the discharge electricity amount. FIG. 18 is a diagram showing an example of the relation between the discharge electricity amount and the positive electrode capacity. FIG. 18 shows that, as the discharge electricity amount increases, the positive electrode capacity decreases. Thus, in the present second embodiment, the positive electrode capacity is calculated by the following equation.

$$\text{Positive electrode capacity} = \text{positive electrode capacity initial value} - c_2 \times \sqrt{(\text{discharge electricity amount})} \quad (7)$$

In this case, the positive electrode capacity initial value represents the positive electrode capacity in the initial state of the battery, and is measured or calculated in advance and stored in memory 104. A coefficient $c_2$ is also obtained in advance by a preliminary test and stored in memory 104.

As described above, the discharge reserve capacity is calculated by the above-mentioned equation (2). Also, the negative electrode capacity and the positive electrode capacity are calculated by the above-mentioned equations (6) and (7), respectively. Then, according to the above-mentioned equation (1), the charge reserve capacity is calculated by subtracting the positive electrode capacity and the discharge reserve capacity from the negative electrode capacity.

Figure 19:
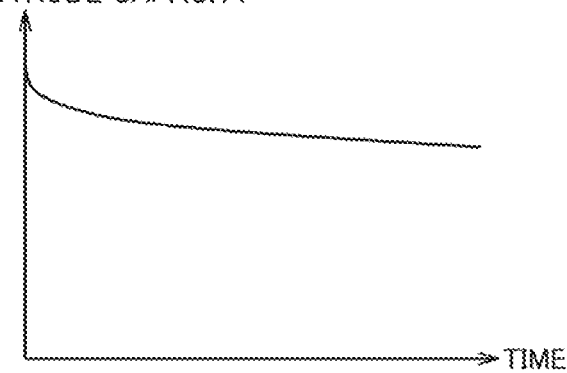
FIG. 19 is a diagram showing an example of transition of the negative electrode capacity.
Figure 20:
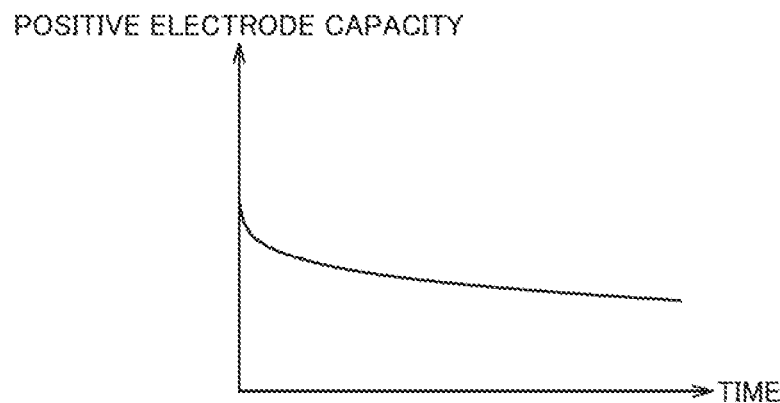
FIG. 20 is a diagram showing an example of transition of the positive electrode capacity.
Figure 21:
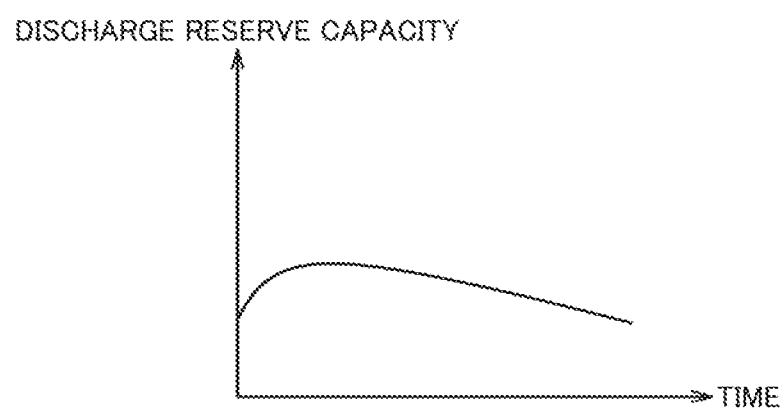
FIG. 21 is a diagram showing an example of transition of the discharge reserve capacity.
Figure 22:
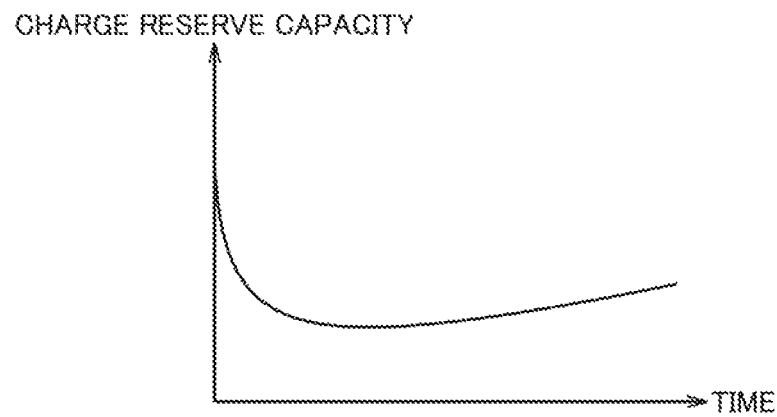
FIG. 22 is a diagram showing an example of transition of the charge reserve capacity.

FIG. 19 is a diagram showing an example of transition of the negative electrode capacity. FIG. 20 is a diagram showing an example of transition of the positive electrode capacity. FIG. 21 is a diagram showing an example of transition of the discharge reserve capacity. FIG. 22 is a diagram showing an example of transition of the charge reserve capacity.

Figure 23:
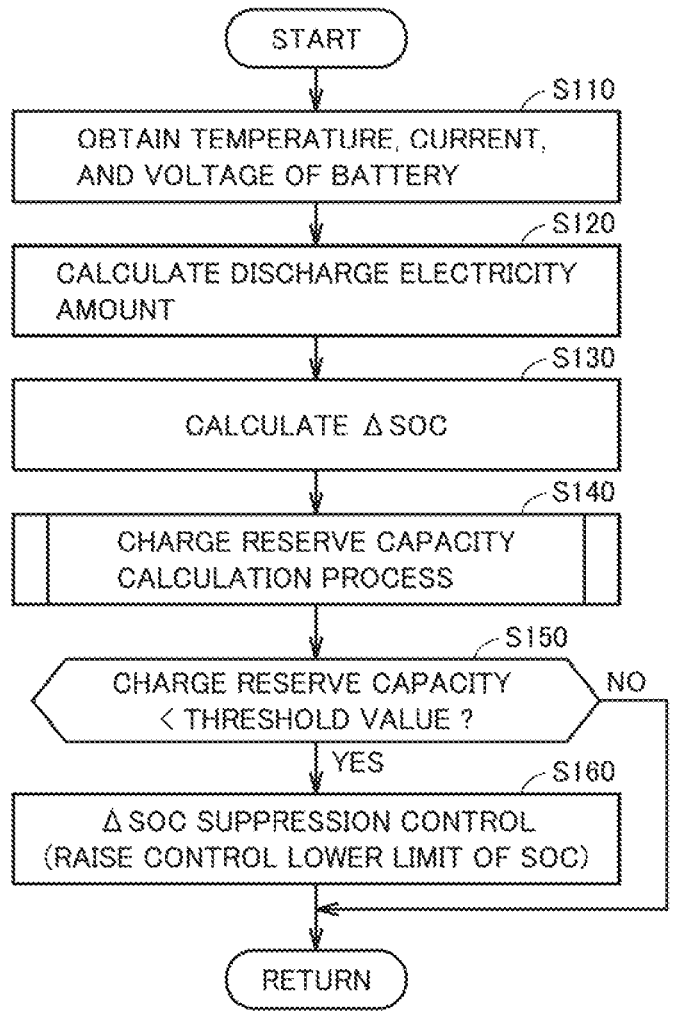
FIG. 23 is a flowchart illustrating an example of a procedure of a process executed by an ECU in the second embodiment.

FIG. 23 is a flowchart illustrating an example of a procedure of a process executed by ECU 100 in the second embodiment. This flowchart corresponds to the flowchart in FIG. 7 described in the first embodiment. The process shown in this flowchart is also repeatedly performed while the system of vehicle 1 operates.

Referring to FIG. 23, the processes in steps S110 to S130, S150, and S160 are the same as the processes in steps S10 to S30, S50, and S60, respectively, in the flowchart in FIG. 7.

In the present second embodiment, when ΔSOC is calculated in step S130, ECU 100 executes a process of calculating the charge reserve capacity using a model (step S140). When the charge reserve capacity is calculated, the process proceeds to step S150, in which the calculated charge reserve capacity is compared with a threshold value.

FIG. 24 is a flowchart illustrating an example of a procedure of a charge reserve capacity calculation process executed in step S140 in FIG. 23. Referring to FIG. 24, ECU 100 first calculates the amount of increase in the discharge reserve capacity resulting from the battery left to stand, according to the above-mentioned equation (3) (step S210). Then, according to the above-mentioned equation (4), ECU 100 calculates the amount of increase in the discharge reserve capacity resulting from charging and discharging (step S220).

When the amounts of increase in the discharge reserve capacities are calculated in steps S210 and S220, ECU 100 adds these amounts of increase in the discharge reserve capacities to thereby calculate a total amount of increase in discharge reserve capacity (term a) (step S230).

Then, ECU 100 calculates the amount of decrease in the discharge reserve capacity (term b) according to the above-mentioned equation (5) (step S240). Then, according to the above-mentioned equation (2), ECU 100 calculates the discharge reserve capacity by subtracting the amount of decrease in the discharge reserve capacity (term b) from the amount of increase in the discharge reserve capacity (term a) (step S250).

Then, ECU 100 calculates the negative electrode capacity according to the above-mentioned equation (6) (step S260). Further, ECU 100 calculates the positive electrode capacity according to the above-mentioned equation (7) (step S270). Then, according to the above-mentioned equation (1), ECU 100 calculates the charge reserve capacity by subtracting the positive electrode capacity calculated in step S270 and the discharge reserve capacity calculated in step S250 from the negative electrode capacity calculated in step S260 (step S280).

As described above, in the present second embodiment, the equations (1) to (7) are applied to calculate the negative electrode capacity, the positive electrode capacity, and the discharge reserve capacity, which are then used to calculate the charge reserve capacity. Therefore, the charge reserve capacity can be accurately calculated.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A battery system comprising:
    a nickel-metal hydride battery; and
    a controller configured to control charging and discharging of the nickel-metal hydride battery, wherein the controller is further configured to:
        calculate a discharge electricity amount showing an integrated value of a current discharged from the nickel-metal hydride battery,
        calculate a state of charge (SOC) variation range of the nickel-metal hydride battery in a prescribed time period, calculate a charge reserve capacity of the nickel-metal hydride battery based on a temperature of the nickel-metal hydride battery, the discharge electricity amount, and the SOC variation range,
calculate a first amount of increase in discharge reserve capacity using a previously obtained correlation among the temperature, time, and an amount of increase in a discharge reserve capacity of the nickel-metal hydride battery,
correct an amount of decrease in the discharge reserve capacity with a previously obtained coefficient to calculate the amount of decrease corrected by a negative electrode SOC of the nickel-metal hydride battery,
perform control to suppress a decrease in the charge reserve capacity based on the calculated charge reserve capacity decreasing below a threshold value,
calculate the first amount of increase in discharge reserve capacity, wherein the first amount of increase in discharge reserve capacity shows the amount of increase resulting from the temperature and the time,
calculate a second amount of increase in discharge reserve capacity using a previously obtained correlation of the amount of increase with the temperature, the discharge electricity amount, and the SOC variation range, the second amount of increase in discharge reserve capacity showing the amount of increase resulting from the temperature, the discharge electricity amount, and the SOC variation range,
correct the amount of decrease in the discharge reserve capacity, wherein the amount of decrease in the discharge reserve capacity is calculated from the temperature and time using a previously obtained correlation among the temperature, the time, and the amount of decrease in the discharge reserve capacity, and the previously obtained coefficient is higher in value as the negative electrode SOC of the nickel-metal hydride battery is higher,
calculate the discharge reserve capacity of the nickel-metal hydride battery by subtracting the corrected amount of decrease in the discharge reserve capacity from a total amount of increase in discharge reserve capacity, the total amount of increase in discharge reserve capacity being obtained by adding the second amount of increase in discharge reserve capacity to the first amount of increase in discharge reserve capacity,
calculate a negative electrode capacity of the nickel-metal hydride battery by subtracting an amount of decrease in the negative electrode capacity from an initial negative electrode capacity in an initial state of the nickel-metal hydride battery, the amount of decrease in the negative electrode capacity being calculated using a previously obtained correlation between the total amount of increase in discharge reserve capacity and the amount of decrease in the negative electrode capacity of the nickel-metal hydride battery,
calculate a positive electrode capacity of the nickel-metal hydride battery by subtracting an amount of decrease in the positive electrode capacity from an initial positive electrode capacity in the initial state of the nickel-metal hydride battery, the amount of decrease in the positive electrode capacity being calculated using a previously obtained correlation between the discharge electricity amount and the amount of decrease in the positive electrode capacity of the nickel-metal hydride battery, and
calculate the charge reserve capacity by subtracting the positive electrode capacity and the discharge reserve capacity from the negative electrode capacity.

2. The battery system according to claim 1, wherein the controller is further configured to control charging and discharging of the nickel-metal hydride battery to reduce the SOC variation range to be smaller when the charge reserve capacity decreases below the threshold value than when the charge reserve capacity dose not decrease below the threshold value.

3. The battery system according to claim 2, wherein the controller is further configured to raise a control lower limit of an SOC of the nickel-metal hydride battery to reduce the SOC variation range to be smaller when the charge reserve capacity decreases below the threshold value than when the charge reserve capacity does not decrease below the threshold value.

4. A method of controlling a battery system including a nickel-metal hydride battery, the method comprising:
calculating a discharge electricity amount showing an integrated value of a current discharged from the nickel-metal hydride battery;
calculating a state of charge (SOC) variation range of the nickel-metal hydride battery in a prescribed time period;
calculating a charge reserve capacity of the nickel-metal hydride battery based on a temperature of the nickel-metal hydride battery, the discharge electricity amount, and the SOC variation range;
calculating a first amount of increase in discharge reserve capacity using a previously obtained correlation among the temperature, time, and an amount of increase in a discharge reserve capacity of the nickel-metal hydride battery;
correcting an amount of decrease in the discharge reserve capacity with a previously obtained coefficient to calculate the amount of decrease corrected by a negative electrode SOC of the nickel-metal hydride battery; and
performing control to suppress a decrease in the charge reserve capacity based on the calculated charge reserve capacity decreasing below a threshold value,
wherein the calculating the charge reserve capacity includes:
calculating the first amount of increase in discharge reserve capacity, wherein the first amount of increase in discharge reserve capacity showing the amount of increase resulting from the temperature and the time;
calculating a second amount of increase in discharge reserve capacity using a previously obtained correlation of the amount of increase with the temperature, the discharge electricity amount, and the SOC variation range, the second amount of increase in discharge reserve capacity showing the amount of increase resulting from the temperature, the discharge electricity amount, and the SOC variation range;
correcting the amount of decrease in the discharge reserve capacity, wherein the amount of decrease in the discharge reserve capacity being calculated from the temperature and time using a previously obtained correlation among the temperature, the time, and the amount of decrease in the discharge reserve capacity, the previously obtained coefficient being higher in value as the negative electrode SOC of the nickel-metal hydride battery is higher;

calculating the discharge reserve capacity of the nickel-metal hydride battery by subtracting the corrected amount of decrease in the discharge reserve capacity from a total amount of increase in discharge reserve capacity, the total amount of increase in discharge reserve capacity being obtained by adding the second amount of increase in discharge reserve capacity to the first amount of increase in discharge reserve capacity;

calculating a negative electrode capacity of the nickel-metal hydride battery by subtracting an amount of decrease in the negative electrode capacity from an initial negative electrode capacity in an initial state of the nickel-metal hydride battery, the amount of decrease in the negative electrode capacity being calculated using a previously obtained correlation between the total amount of increase in discharge reserve capacity and the amount of decrease in the negative electrode capacity of the nickel-metal hydride battery;

calculating a positive electrode capacity of the nickel-metal hydride battery by subtracting an amount of decrease in the positive electrode capacity from an initial positive electrode capacity in the initial state of the nickel-metal hydride battery, the amount of decrease in the positive electrode capacity being calculated using a previously obtained correlation between the discharge electricity amount and the amount of decrease in the positive electrode capacity of the nickel-metal hydride battery; and calculating the charge reserve capacity by subtracting the positive electrode capacity and the discharge reserve capacity from the negative electrode capacity.

5. The method of controlling a battery system according to claim 4, wherein the performing control includes controlling charging and discharging of the nickel-metal hydride battery to reduce the SOC variation range to be smaller when the charge reserve capacity decreases below the threshold value than when the charge reserve capacity dose not decrease below the threshold value.

6. The method of controlling a battery system according to claim 5, wherein the performing control includes raising a control lower limit of an SOC of the nickel-metal hydride battery to reduce the SOC variation range to be smaller when the charge reserve capacity decreases below the threshold value than when the charge reserve capacity does not decrease below the threshold value.

* * * * *